(12) United States Patent
Furuse et al.

(10) Patent No.: US 8,247,337 B2
(45) Date of Patent: Aug. 21, 2012

(54) ALUMINA SINTERED ARTICLE

(75) Inventors: Tatsuji Furuse, Kirishima (JP); Shinya Yokomine, Kirishima (JP); Hiroaki Seno, Kirishima (JP)

(73) Assignee: Kyocera Corporation, Kyoto (JP)

( * ) Notice: Subject to any disclaimer, the term of this patent is extended or adjusted under 35 U.S.C. 154(b) by 10 days.

(21) Appl. No.: 12/745,246

(22) Filed: May 27, 2010

(65) Prior Publication Data

US 2010/0311563 A1 Dec. 9, 2010

Related U.S. Application Data

(63) Continuation of application No. PCT/JP2008/071699, filed on Nov. 28, 2008.

(30) Foreign Application Priority Data

| Nov. 28, 2007 | (JP) | 2007-307350 |
| Mar. 26, 2008 | (JP) | 2008-080842 |
| Oct. 29, 2008 | (JP) | 2008-278133 |
| Oct. 29, 2008 | (JP) | 2008-278134 |
| Nov. 26, 2008 | (JP) | 2008-301038 |

(51) Int. Cl.
*C04B 35/195* (2006.01)
*C04B 35/10* (2006.01)

(52) U.S. Cl. ........ 501/125; 501/128

(58) Field of Classification Search .......... 501/125, 501/128
See application file for complete search history.

(56) References Cited

U.S. PATENT DOCUMENTS

| 5,686,366 A | 11/1997 | Koyama et al. |
| 7,285,507 B2 * | 10/2007 | Fukuta et al. ........ 501/8 |
| 7,799,717 B2 * | 9/2010 | Walker, Jr. ........ 501/105 |
| 2011/0077141 A1 * | 3/2011 | Walker et al. ........ 501/32 |

FOREIGN PATENT DOCUMENTS

| JP | 5301762 A | 11/1993 |
| JP | 6-16469 A | 1/1994 |
| JP | 8208317 A | 8/1996 |
| JP | 8235933 A | 9/1996 |
| JP | 2000272960 | * 1/2000 |
| JP | 2003238249 A | 8/2003 |
| JP | 2005050875 A | 2/2005 |
| JP | 2007254273 A | 10/2007 |

* cited by examiner

*Primary Examiner* — Karl Group
(74) *Attorney, Agent, or Firm* — Birch, Stewart, Kolasch & Birch, LLP

(57) ABSTRACT

An alumina sintered article comprising 99.3 mass % or more Al in terms of $Al_2O_3$, strontium and silicon is disclosed. The alumina sintered article also comprises alumina crystal grains and an oxide crystal comprising aluminum, silicon, strontium located at a triple pocket surrounded by three or more alumina crystal grains. The alumina sintered article improves dielectric loss in the megahertz to gigahertz bands while maintaining corrosion resistance, mechanical properties of alumina.

14 Claims, 11 Drawing Sheets

Figure 2

| Sample No. | Raw Material Composition (mass%) | | | | | Sintered Article Composition (mass%) | | | | | | Is a SrAl$_2$Si$_2$O$_8$ type crystal in a triple point? |
|---|---|---|---|---|---|---|---|---|---|---|---|---|
| | Al$_2$O$_3$ | SiO$_2$ | MgO | CaO | SrO | Al$_2$O$_3$ | SiO$_2$ | MgO | CaO | SrO | Remainder | |
| 1-1 | 99.71 | 0.13 | 0.05 | 0.08 | 0.03 | 99.64 | 0.15 | 0.05 | 0.09 | 0.03 | 0.04 | Yes |
| 1-2 | 99.71 | 0.12 | 0.05 | 0.07 | 0.05 | 99.64 | 0.14 | 0.05 | 0.08 | 0.05 | 0.04 | Yes |
| 1-3 | 99.71 | 0.12 | 0.04 | 0.07 | 0.06 | 99.64 | 0.15 | 0.04 | 0.07 | 0.06 | 0.04 | Yes |
| 1-4 | 99.79 | 0.11 | — | — | 0.10 | 99.73 | 0.13 | — | — | 0.10 | 0.04 | Yes |
| 1-5 | 99.79 | 0.11 | 0.01 | — | 0.09 | 99.73 | 0.13 | 0.01 | — | 0.09 | 0.04 | Yes |
| 1-6 | 99.78 | 0.10 | 0.03 | — | 0.09 | 99.73 | 0.12 | 0.03 | — | 0.09 | 0.03 | Yes |
| 1-7 | 99.78 | 0.09 | 0.05 | — | 0.08 | 99.73 | 0.11 | 0.05 | — | 0.08 | 0.03 | Yes |
| 1-8 | 99.77 | 0.07 | 0.10 | — | 0.06 | 99.73 | 0.09 | 0.10 | — | 0.06 | 0.02 | Yes |
| 1-9 | 99.72 | 0.14 | 0.05 | 0.05 | 0.04 | 99.64 | 0.16 | 0.05 | 0.07 | 0.04 | 0.04 | Yes |
| 1-10 | 99.71 | 0.14 | 0.05 | 0.04 | 0.06 | 99.65 | 0.16 | 0.05 | 0.05 | 0.06 | 0.03 | Yes |
| 1-11 | 99.70 | 0.16 | 0.03 | 0.04 | 0.07 | 99.64 | 0.18 | 0.03 | 0.05 | 0.07 | 0.03 | Yes |
| 1-12 | 99.42 | 0.28 | 0.10 | 0.08 | 0.12 | 99.30 | 0.32 | 0.10 | 0.12 | 0.12 | 0.04 | Yes |
| 1-13 | 99.70 | 0.17 | 0.09 | 0.04 | — | 99.65 | 0.17 | 0.09 | 0.05 | — | 0.04 | No |

Figure 3

| Sample No. | Ratio in Triple Pockets (%) MAl₂Si₂O₈ | Ratio in Triple Pockets (%) M Element | Ratio in Triple Pockets (%) amorphouse body | Spinel Crystals | Average Grain Diameter (D₅₀) (μm) | Bending Strength (MPa) | Density (g/cm³) | Dielectric loss (tanδ) 1MHz | Dielectric loss (tanδ) 12MHz | Dielectric loss (tanδ) 8.5GHz (×10⁻⁴) |
|---|---|---|---|---|---|---|---|---|---|---|
| 1-1 | 80.0 | Sr,Ca | 13.3 | CaAl₁₂O₁₉ | 3.0 | 380 | 3.89 | 12 | 1.6 | 1.7 |
| 1-2 | 73.3 | Sr,Ca | 20.0 | CaAl₁₂O₁₉ | 3.0 | 380 | 3.90 | 18 | 3.4 | 1.8 |
| 1-3 | 63.3 | Sr,Ca | 33.3 | CaAl₁₂O₁₉ | 3.0 | 380 | 3.91 | 20 | 5.1 | 1.8 |
| 1-4 | 80.0 | Sr | 20.0 | N/A | 9.7 | 350 | 3.84 | 13 | 2.9 | 1.4 |
| 1-5 | 83.3 | Sr | 16.7 | N/A | 9.8 | 360 | 3.87 | 11 | 3.0 | 1.4 |
| 1-6 | 86.7 | Sr | 13.3 | N/A | 9.0 | 370 | 3.88 | 9 | 2.7 | 1.3 |
| 1-7 | 66.7 | Sr | 33.3 | N/A | 5.0 | 360 | 3.88 | 19 | 3.8 | 1.7 |
| 1-8 | 56.7 | Sr | 30.0 | MgAl₂O₄ | 1.0 | 390 | 3.89 | 29 | 4.8 | 2.2 |
| 1-9 | 80.0 | Sr,Ca | 6.7 | CaAl₁₂O₁₉ | 5.0 | 360 | 3.89 | 10 | 2.4 | 1.5 |
| 1-10 | 86.7 | Sr,Ca | 10.0 | CaAl₁₂O₁₉ | 5.0 | 360 | 3.90 | 5 | 2.6 | 1.3 |
| 1-11 | 80.0 | Sr,Ca | 6.7 | CaAl₁₂O₁₉ | 5.0 | 360 | 3.90 | 10 | 0.2 | 0.8 |
| 1-12 | 90.0 | Sr,Ca | 3.3 | MgAl₂O₄ | 9.8 | 360 | 3.90 | 1 | 1.5 | 0.8 |
| 1-13 | 3.3 | Ca | 70.0 | MgAl₂O₄ | 5.0 | 360 | 3.89 | 40 | 7.0 | 1.4 |

Figure 5

| Sample No. | Sintered Article Composition (mass%) | | | | | | | Is a SrAl$_2$Si$_2$O$_8$ type crystal in a triple point? |
|---|---|---|---|---|---|---|---|---|
| | Al$_2$O$_3$ | SiO$_2$ | SrO | MgO | CaO | BaO | Remainder | |
| 2-1 | 99.65 | 0.02 | 0.08 | 0.10 | 0.11 | - | 0.04 | Yes |
| 2-2 | 99.65 | 0.05 | 0.08 | 0.05 | 0.13 | - | 0.04 | Yes |
| 2-3 | 99.55 | 0.20 | 0.08 | 0.02 | 0.11 | - | 0.04 | Yes |
| 2-4 | 99.5 | 0.25 | 0.08 | 0.03 | 0.10 | - | 0.04 | Yes |
| 2-5 | 99.45 | 0.3 | 0.08 | 0.03 | 0.10 | - | 0.04 | Yes |
| 2-6 | 99.25 | 0.5 | 0.04 | - | 0.17 | - | 0.04 | Yes |
| 2-7 | 99.65 | 0.20 | 0.01 | 0.05 | 0.01 | 0.04 | 0.04 | Yes |
| 2-8 | 99.55 | 0.25 | 0.06 | 0.05 | 0.05 | - | 0.04 | Yes |
| 2-9 | 99.65 | 0.14 | 0.10 | 0.06 | 0.01 | - | 0.04 | Yes |
| 2-10 | 99.55 | 0.14 | 0.16 | 0.10 | 0.01 | - | 0.04 | Yes |
| 2-11 | 99.25 | 0.14 | 0.50 | 0.03 | 0.04 | - | 0.04 | Yes |
| 2-12 | 99.30 | 0.30 | 0.15 | 0.10 | 0.11 | - | 0.04 | Yes |
| 2-13 | 99.45 | 0.20 | 0.10 | 0.10 | 0.11 | - | 0.04 | Yes |
| 2-14 | 99.65 | 0.17 | - | 0.09 | 0.05 | - | 0.04 | No |

Figure 6

| Sample No. | Ratio in Triple Pockets (%) MAl$_2$Si$_2$O$_8$ | Ratio in Triple Pockets (%) M Element | Ratio in Triple Pockets (%) amorphouse body | Spinel Crystals | Average Grain Diameter (D$_{50}$) (μm) | Bending Strength (MPa) | Density (g/cm³) | Dielectric loss (tanδ) 1MHz | Dielectric loss (tanδ) 12MHz | Dielectric loss (tanδ) (×10$^{-4}$) 8.5GHz |
|---|---|---|---|---|---|---|---|---|---|---|
| 2-1 | 50.0 | Sr,Ca | 40.0 | MgAl$_2$O$_4$ | 10 | 350 | 3.87 | 29 | <5 | 6.2 |
| 2-2 | 60.0 | Sr,Ca | 37.0 | CaAl$_{12}$O$_{19}$ | 20 | 330 | 3.88 | 4 | <5 | 2.2 |
| 2-3 | 90.0 | Sr,Ca | 3.0 | CaAl$_{12}$O$_{19}$ | 40 | 312 | 3.88 | 1 | <5 | 2.1 |
| 2-4 | 93.3 | Sr,Ca | 3.3 | CaAl$_{12}$O$_{19}$ | 45 | 307 | 3.88 | 1 | <5 | 1.3 |
| 2-5 | 96.7 | Sr,Ca | 3.3 | N/A | 45 | 305 | 3.89 | 1 | <5 | 1.3 |
| 2-6 | 50.0 | Sr,Ca | 50.0 | N/A | 100 | 230 | 3.85 | 71 | 20 | 6.5 |
| 2-7 | 90.0 | Sr,Ca,Ba | 10.0 | N/A | 30 | 324 | 3.89 | 4 | <5 | 1.3 |
| 2-8 | 93.3 | Sr,Ca | 6.7 | N/A | 30 | 325 | 3.89 | 2 | <5 | 1.3 |
| 2-9 | 96.7 | Sr,Ca | 3.3 | N/A | 35 | 320 | 3.89 | 1 | <5 | 1.3 |
| 2-10 | 96.7 | Sr,Ca | 0.0 | MgAl$_2$O$_4$ | 15 | 343 | 3.88 | 1 | <5 | 1.3 |
| 2-11 | 50.0 | Sr,Ca | 40.0 | CaAl$_{12}$O$_{19}$ | 30 | 324 | 3.85 | 20 | 6 | 6.0 |
| 2-12 | 96.7 | Sr,Ca | 0.0 | MgAl$_2$O$_4$ | 15 | 345 | 3.90 | 1 | <5 | 1.0 |
| 2-13 | 96.7 | Sr,Ca | 0.0 | MgAl$_2$O$_4$ | 15 | 344 | 3.90 | 1 | <5 | 0.8 |
| 2-14 | 3.3 | Ca | 70.0 | MgAl$_2$O$_4$ | 10 | 350 | 3.89 | 45 | 8 | 1.6 |

Figure 8

| Sample No. | Sintered Article Composition (mass%) | | | | | | | Is a SrAl$_2$Si$_2$O$_8$ type crystal in a triple point? |
|---|---|---|---|---|---|---|---|---|
| | Al$_2$O$_3$ | SiO$_2$ | SrO | MgO | CaO | BaO | Remainder | |
| 3-1 | 99.65 | 0.02 | 0.08 | 0.10 | 0.11 | - | 0.04 | Yes |
| 3-2 | 99.65 | 0.05 | 0.08 | 0.05 | 0.13 | - | 0.04 | Yes |
| 3-3 | 99.55 | 0.20 | 0.08 | 0.02 | 0.11 | - | 0.04 | Yes |
| 3-4 | 99.5 | 0.25 | 0.08 | 0.03 | 0.10 | - | 0.04 | Yes |
| 3-5 | 99.45 | 0.3 | 0.08 | 0.03 | 0.10 | - | 0.04 | Yes |
| 3-6 | 99.25 | 0.5 | 0.04 | - | 0.17 | - | 0.04 | Yes |
| 3-7 | 99.65 | 0.20 | 0.01 | 0.05 | 0.01 | 0.04 | 0.04 | Yes |
| 3-8 | 99.55 | 0.25 | 0.06 | 0.05 | 0.05 | — | 0.04 | Yes |
| 3-9 | 99.65 | 0.14 | 0.10 | 0.06 | 0.01 | — | 0.04 | Yes |
| 3-10 | 99.55 | 0.14 | 0.16 | 0.10 | 0.01 | — | 0.04 | Yes |
| 3-11 | 99.25 | 0.14 | 0.50 | 0.03 | 0.04 | — | 0.04 | Yes |
| 3-12 | 99.30 | 0.30 | 0.15 | 0.10 | 0.11 | — | 0.04 | Yes |
| 3-13 | 99.45 | 0.20 | 0.10 | 0.10 | 0.11 | — | 0.04 | Yes |
| 3-14 | 99.65 | 0.17 | — | 0.09 | 0.05 | — | 0.04 | No |

Figure 9

| Sample No. | Ratio in Triple Pockets (%) | | M Element | amorphous body | Spinel Crystals | Average Grain Diameter ($D_{50}$) (μm) | Bending Strength (MPa) | Density (g/cm³) | Dielectric loss (tanδ) (×10⁻⁴) | | |
|---|---|---|---|---|---|---|---|---|---|---|---|
| | $MAl_2Si_2O_8$ | | | | | | | | 1MHz | 12MHz | 8.5GHz |
| 3-1 | 3.3 | Sr,Ca | 93.3 | $MgAl_2O_4$ | 15 | 345 | 3.88 | 25 | <5 | 6.5 |
| 3-2 | 10.0 | Sr,Ca | 80.0 | $CaAl_{12}O_{19}$ | 40 | 311 | 3.90 | 1 | <5 | 2.3 |
| 3-3 | 13.3 | Sr,Ca | 83.3 | $CaAl_{12}O_{19}$ | 50 | 305 | 3.90 | 1 | <5 | 2.2 |
| 3-4 | 16.7 | Sr,Ca | 76.7 | $CaAl_{12}O_{19}$ | 55 | 300 | 3.90 | 1 | <5 | 1.5 |
| 3-5 | 16.7 | Sr,Ca | 83.3 | N/A | 55 | 303 | 3.91 | 1 | <5 | 1.5 |
| 3-6 | 6.7 | Sr,Ca | 93.3 | N/A | 100 | 230 | 3.87 | 50 | 15 | 6.5 |
| 3-7 | 10.0 | Sr,Ba | 90.0 | N/A | 35 | 319 | 3.91 | 2 | <5 | 1.5 |
| 3-8 | 13.3 | Sr,Ca | 86.7 | N/A | 40 | 312 | 3.91 | 1 | <5 | 1.5 |
| 3-9 | 20.0 | Sr | 80.0 | N/A | 40 | 310 | 3.91 | 1 | <5 | 1.5 |
| 3-10 | 20.0 | Sr | 70.0 | $MgAl_2O_4$ | 25 | 323 | 3.90 | 1 | <5 | 1.5 |
| 3-11 | 6.0 | Sr,Ca | 70.0 | $CaAl_{12}O_{19}$ | 40 | 313 | 3.87 | 15 | <5 | 6.0 |
| 3-12 | 23.3 | Sr,Ca | 66.7 | $MgAl_2O_4$ | 25 | 325 | 3.92 | 1 | <5 | 1.2 |
| 3-13 | 20.0 | Sr,Ca | 70.0 | $MgAl_2O_4$ | 25 | 327 | 3.92 | 1 | <5 | 1.0 |
| 3-14 | 3.3 | Ca | 70.0 | $MgAl_2O_4$ | 10 | 350 | 3.90 | 45 | 8 | 1.6 |

ALUMINA SINTERED ARTICLE

CROSS-REFERENCE TO RELATED APPLICATION

This application is a continuation in part based on PCT Application No. JP2008/071699, filed Nov. 28, 2007, which claims the benefit of Japanese Application No. 2007-307350, filed on Nov. 28, 2007, Japanese Application No. 2008-080842, filed on Mar. 26, 2008, Japanese Application No. 2008-278133, filed on Oct. 29, 2008, Japanese Application No. 2008-278134, filed on Oct. 29, 2008, and Japanese Application No. 2008-301038, filed on Nov. 11, 2008, all entitled "ALUMINOUS SINTER, PROCESS FOR PRODUCING THE SAME, MEMBER FOR SEMICONDUCTOR PRODUCTION APPARATUS, MEMBER FOR LIQUID-CRYSTAL-PANEL PRODUCTION APPARATUS, AND MEMBER FOR DIELECTRIC RESONATOR," the contents of which are incorporated by reference herein in their entirety.

FIELD

Embodiments of the present disclosure relate generally to an alumina sintered article, and more particularly relate to alumina sintered articles applicable to members of a semiconductor manufacturing apparatus, liquid-crystal-display (LCD) panel manufacturing apparatus and a dielectric resonator.

BACKGROUND

Alumina sintered articles have heat resistance, chemical resistance, and plasma resistance, and also have a low dielectric dissipation factor (dielectric loss or tan δ) in a high frequency range. Thereby, alumina sintered articles is used for members of a semiconductor manufacturing apparatus and members of a apparatus for manufacturing LCD panels such as members for use in high frequency plasma apparatuses and the like.

Since such members of semiconductor or LCD manufacturing apparatuses contact with highly corrosive cleaning gases comprising halogen and plasma thereof, alumina sintered articles with a high purity of 99.0 mass % or more may be used as the members.

On the other hand, dielectric loss of alumina sintered article having less impurities and additives may be high. In this case, the transmission rate of high frequencies in the megahertz band of the alumina article may be decreased, energy loss may be increased or heat generated may break the alumina article.

Alumina sintered articles with a certain range of contents of $SiO_2$, CaO, and MgO as sintering aids may result in low loss, thereby yielding alumina sintered articles with improved high-frequency dielectric properties as well as low firing temperatures.

The alumina sintered article comprises 99.8 to 99.9 mass % of alumina and a grain boundary comprising $SiO_2$, CaO, and MgO at a predetermined ratio, and has a Q value of 10000 or more and a dielectric loss of 0.0001 or less at a frequency of 8 GHz.

However, the alumina sintered articles have high dielectric loss in the megahertz band, and for example, when the alumina sintered articles are used for members for high frequency plasma apparatuses for semiconductors, and the like for use at high frequencies in the megahertz band, the transmission rate of high frequencies in the megahertz band will be decreased, thereby leading to occurrence of problems such as increase in energy loss or breakage of the member due to heat generation.

An alumina sintered article may comprise anisotropic crystal grains comprising a composite oxide with Al and at least one of La, Ca, Sr, Ba, Sm, Nd, and Ti to improve oxidation resistance and mechanical properties.

The alumina sintered article may comprise alumina crystal grains with an average crystal grain diameter of 10 μm or less, and 1 to 20 volume % of anisotropic crystal grains with a longitudinal length of 20 μm or more with respect to the total amount thereof, thereby resulting in improved fracture toughness and improved strength at a room temperature.

However, the alumina sintered article has low dielectric loss. In this case, the transmission rate of high frequencies in the megahertz band will be decreased when used at high frequencies of the megahertz band such as used for members of plasma apparatuses for semiconductors and the like.

SUMMARY

An alumina sintered article comprising 99.3 mass % or more Al in terms of $Al_2O_3$, strontium and silicon is disclosed. The alumina sintered article also comprises alumina crystal grains and an oxide crystal comprising aluminum, silicon, strontium located at a triple pocket surrounded by three or more alumina crystal grains. The alumina sintered article improves dielectric loss in the megahertz to gigahertz bands while maintaining corrosion resistance, mechanical properties of alumina.

In a first embodiment, an alumina sintered article comprises 99.3 mass % or more Al in terms of $Al_2O_3$; 0.05 mass % or more Si in terms of $SiO_2$; and 0.01 mass % or more Sr in terms of SrO. The alumina sintered article also comprises alumina crystal grains as main crystal grains; and a crystal comprising Si, Al, Sr, and O at a triple pocket of the alumina crystal grains.

A second embodiment comprises a method of for producing an alumina sintered article, comprises adding powders comprising Sr and Si to alumina powders, and mixing thereof; forming a resultant mixture into a powder compact with a predetermined shape; and calcining the powder compact such that a resultant alumina sintered article comprises 99.3 mass % or more Al as an element in terms of $Al_2O_3$ and as other elements, 0.05 mass % or more Si in terms of $SiO_2$ and 0.01 mass % or more Sr in terms of SrO.

A third embodiment comprises a member of a semiconductor manufacturing apparatus comprises the above-mentioned alumina sintered article.

A fourth embodiment comprises a member of a liquid-crystal-panel manufacturing apparatus comprising the above-mentioned alumina sintered article.

A fifth embodiment comprises a member of a dielectric resonator comprising the above-mentioned alumina sintered article.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 2 is a table showing exemplary experimental results according to various embodiments of the disclosure.

FIG. 3 is a table showing exemplary experimental results according to various embodiments of the disclosure.

FIG. 5 is a table showing exemplary experimental results according to various embodiments of the disclosure.

FIG. 6 is a table showing exemplary experimental results according to various embodiments of the disclosure.

FIG. 8 is a table showing exemplary experimental results according to various embodiments of the disclosure.

FIG. 9 is a table showing exemplary experimental results according to various embodiments of the disclosure.

DETAILED DESCRIPTION OF EXEMPLARY EMBODIMENTS

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, an alumina sintered article Embodiments of the disclosure, however, are not limited to such alumina sintered articles, and the techniques described herein may also be utilized in other applications. For example, embodiments may be applicable to a member for a semiconductor manufacturing apparatus, a member for a liquid-crystal-panel manufacturing apparatus, a member for a dielectric resonator, and the like.

More specifically, embodiments may be applicable to an inner wall material (or chamber wall), a microwave introduction window, a shower head, a focusing ring, and a shield ring for a semiconductor manufacturing apparatus, members for use in a stage, a mirror, a mask holder, a mask stage, a chuck, a reticle, and the like for a liquid-crystal-panel manufacturing apparatus, a variety of materials for resonators and dielectric substrate materials for MIC, and materials for dielectric waveguides for use in high frequency regions such as microwaves, millimeter waves, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
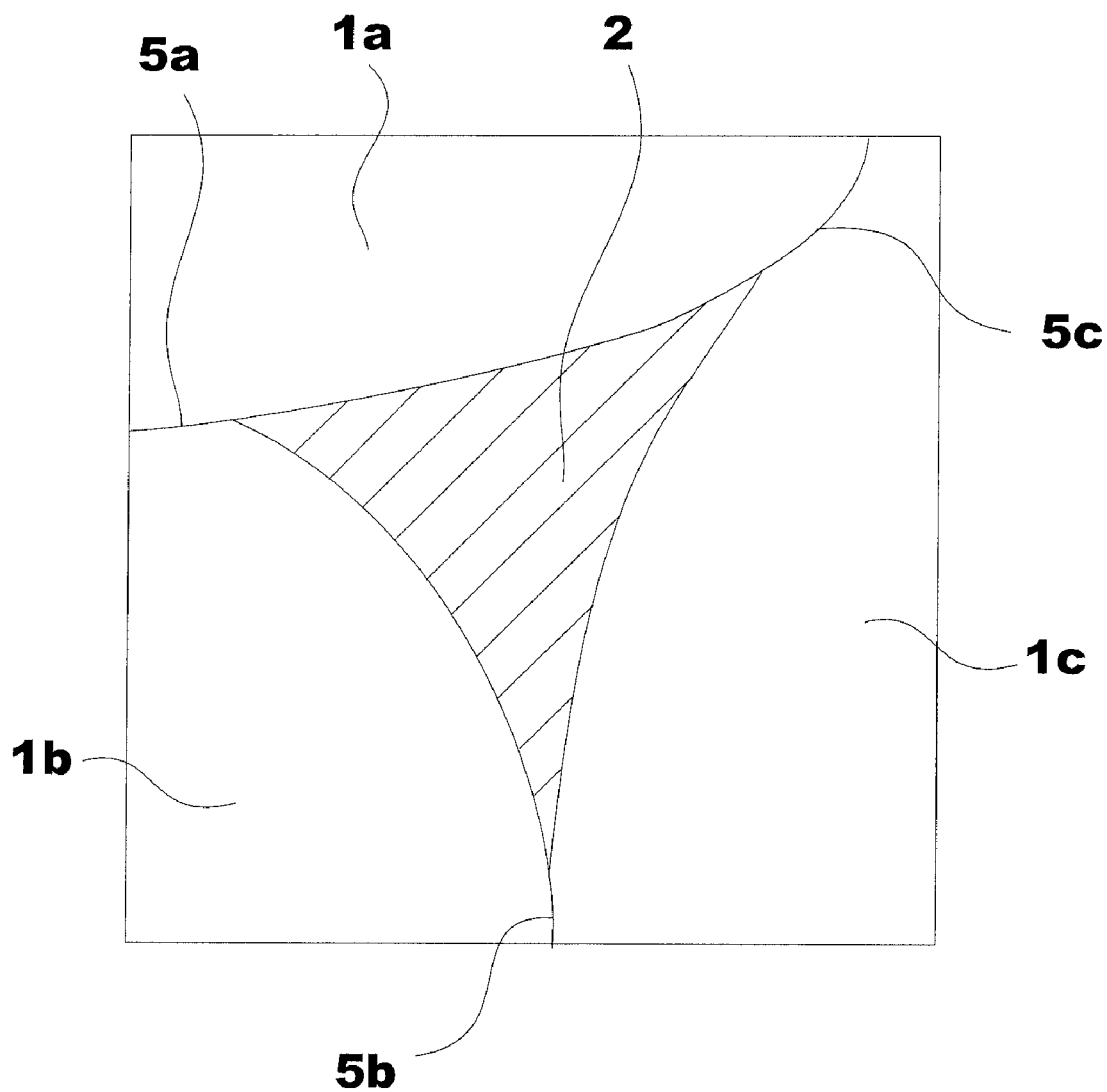
FIG. 1 is an illustration of a schematic cross sectional view of an exemplary alumina sintered article according to an embodiment of the disclosure.

FIG. 1 is an illustration of a schematic cross sectional view of an exemplary alumina sintered article according to an embodiment of the disclosure. The alumina sintered article comprises alumina crystal grains $1a$, $1b$ and $1c$ as main crystal grains, and a triple pocket 2, In the present disclosure, a triple pocket among the alumina crystal grains refers to a space surrounded by three or more alumina crystal grains. In FIG. 1, for example and without limitation, the triple pocket 2 is surrounded by the three alumina crystal grains $1a$, $1b$ and $1c$. The triple pocket is different from a grain boundary located between two planes of alumina crystal grains. In FIG. 1, grain boundaries $5a$, $5b$ and $5c$ are located between the alumina crystal grains $1a$ and $1b$, the alumina crystal grains $1b$ and $1c$, and the alumina crystal grains $1c$ and $1a$, respectively.

The alumina sintered article also comprises Si and Sr. The alumina sintered article comprises a crystal with low dielectric loss. The crystal comprises Si, Al, Sr, and O and is located at a triple pocket among the alumina crystal grains.

In known alumina sintered articles, a component added as a sintering aid tends to form glass or crystals with a high dielectric loss among alumina crystal grains, thereby increasing the dielectric loss of the entire alumina sintered article. However, according to an embodiment of the present disclosure, a crystal comprising Si, Al, Sr, and O (hereinafter also called a low loss crystal) is precipitated at triple pockets among alumina crystal grains, the dielectric loss of the entire alumina sintered article in the megahertz to gigahertz bands can be lowered because the crystal itself has a low dielectric loss.

While Mg and Ca are known as sintering aids among alkaline-earth metals, Sr and B are too large in ion radius to be used as a sintering aid. In an embodiment of the present disclosure, Sr is not used as a sintering aid. However, Sr is used for precipitating a crystal which comprises Si, Al, Sr and O and has a low dielectric loss. Such a low dielectric loss crystal can lower the dielectric loss of the alumina sintered article.

The low dielectric loss crystal may comprise a $SrAl_2Si_2O_8$ type crystal. The $SrAl_2Si_2O_8$ type crystal comprises a stoichiometric composition of $SrAl_2Si_2O_8$. Alternatively, the $SrAl_2Si_2O_8$ type crystal may have a composition slightly different from the stoichiometric composition. In addition, the $SrAl_2Si_2O_8$ type crystal comprises crystals with some of constituent elements substituted with other element. For example and without limitation, the $SrAl_2Si_2O_8$ type crystal comprises $(Sr, Ca)Al_2Si_2O_8$.

In an embodiment of the present disclosure, the low dielectric loss crystal may be located at a triple pocket among the alumina crystal grains. The ratio of a number of triple pockets comprising the low dielectric loss crystal to a number of all triple pockets in an alumina sintered article is 10% or more.

In order for the ratio equal to or more than 10%, raw powders comprising Si and Sr are mixed and added to alumina powder, as described below. If raw powders Si and Sr are individually added to alumina powder, Si and Sr will be unevenly located at the triple pockets, thereby causing a high dielectric loss. However, in this case, the low dielectric loss crystal may be formed in a small amount, but the ratio is less than 10%.

In order to lower the dielectric loss in a frequency range of 1 MHz to 8.5 GHz, the low dielectric loss crystals are located at 20% or more of all triple pockets.

In an embodiment of the present disclosure, an amorphous body comprising Si, Al, Sr, and O may be located and no low dielectric loss crystal may be found at some of the triple pockets among the alumina crystal grains. The amorphous body may be located, without limitation, at 90% or less of the triple pockets, and particularly 80% or less of the triple pockets in a predetermined area of any cross section. As described above, while the amorphous body can improve the density of the sintered article, the amorphous body increases the dielectric loss. Thus, the sintered article may have less amorphous body.

In an embodiment of the present disclosure, the ratio of a number of triple pockets comprising the low dielectric loss crystal to a number of all triple pockets in an alumina sintered article may be 60% or more. That is, a crystal composed of a compound comprising Si, Al, and Sr is found at triple points which is equal to or more than 60% in number of all triple pockets 2 surrounded by three or more alumina crystal grains 1 in a predetermined area of any cross section of the alumina sintered article. In a same manner, the ratio of the triple pockets comprising the low dielectric loss crystal in all triple pockets is defined as a ratio of the number of triple pockets comprising the low dielectric loss crystal to total number of triple pockets observed in a cross section.

In the present disclosure, in order for the ratio equal to or more than 60%, as described below, raw powders for constituting the crystal are mixed and ground, this mixed powder is calcined to synthesize a crystal comprising Si, Al, and Sr, and the crystal is added to alumina powder. Alternatively, in order for the crystal composed of a compound comprising Si, Al, and Sr to be present, raw powders for Si and Sr are mixed and ground, and this mixed powder is calcined and added to alumina powders.

The ratio is 60% or more, then the dielectric loss of the alumina sintered article can be further lowered. In order to further lower the dielectric loss in a frequency range of 1 MHz to 8.5 GHz, the ratio may be 80% or more.

The triple pockets 2 found in any cross section of the alumina sintered article may comprise a crystal and/or an amorphous body, both comprising a compound comprising Si, Al, and Sr. In an embodiment of the present disclosure, some of the triple pockets 2 may not comprise the crystal comprising Si, Al and Sr but may comprise the amorphous body or other crystal grains mentioned below. 30% or less, particularly 20% or less of all triple pockets in a predetermined area of any cross section may comprise the amorphous body. In an embodiment, the amorphous body may not be found in any triple pockets.

In an embodiment, the alumina sintered article may have an average grain diameter $D_{50}$ of 10 μm or more. The large average grain diameter $D_{50}$ of 10 μm or more may reduce the number of grain boundaries, thereby allowing the dielectric loss to be further lowered in 1 MHz to 8.5 GHz.

The average grain diameter $D_{50}$ of the alumina crystal grains 1 may be 15 μm or more, particularly 25 μm or more, and further 40 μm or more for stabilizing the dielectric loss. The average grain diameter $D_{50}$ of the alumina crystal grains 1 is 70 μm or less from the point of view of mechanical properties. In the disclosure, the average grain diameter $D_{50}$ refers to a grain size at the cumulative distribution 50% from the fine grain side in the cumulative grain size distribution. The average grain diameter can be controlled by, for example and without limitation, a firing temperature.

On the other hand, when the average grain diameter $D_{50}$ of alumina crystal grains is less than 10 μm, the dielectric loss may be slightly increased, but the strength of sintered article can be improved.

In an embodiment of the disclosure, the alumina sintered article comprises 99.3 mass % or more of Al in terms of $Al_2O_3$, 0.05 mass % or more of Si in terms of $SiO_2$, and 0.01 mass % or more of Sr in terms of SrO. The alumina sintered article may comprise Mg as an accessory component. While the element Mg is an arbitrary component, the element Mg comprised therein can improve the electrical properties such as the dielectric loss, and can improve the sintering property and thus can improve the mechanical properties.

The alumina sintered article comprises Ca as an accessory component besides Si, Mg, and Sr. While the element Ca is not always necessary, the addition of the element Ca in the same way as the element Mg improves the sintering property, and the element Ca is added in appropriate amounts from the point of view of electrical and mechanical properties. In the case of the element Ca comprised therein, a low loss $SrAl_2Si_2O_8$ type crystal comprising Ca is formed among alumina crystal grains. This low dielectric loss crystal is a compound represented by $(Sr, Ca)Al_2Si_2O_8$ from the point of view of electrical properties. The low dielectric loss crystal may be a compound shifted from the stoichiometric composition besides $(Sr, Ca)Al_2Si_2O_8$.

The alumina sintered article according to the present disclosure comprises 99.3 mass % or more Al in terms of $Al_2O_3$ and further 0.7 mass % or less accessory components. The 99.3 mass % or more Al comprised in terms of $Al_2O_3$ allows the good corrosion resistance, mechanical properties, and electrical properties of $Al_2O_3$ to be retained at the same time as the improvement in sintering property. The amount of accessory components of 0.7 mass % or more leads to decrease in mechanical and electrical characteristics and decrease in resistance to plasma. Therefore, the element Al is in the article at 99.3 mass % or more in terms of $Al_2O_3$, and the accessory components are in the article at 0.7 mass % or less.

With respect to the accessory elements, the sintered article comprises 0.05 to 0.3 mass % Si in terms of $SiO_2$, 0.01 to 0.16 mass % Sr in terms of SrO. This composition range allows for improvement in the sintering property of $Al_2O_3$, and improvement in mechanical properties and electrical properties due to the formation of the element crystals comprising the elements Si, Al, Sr, and O.

In addition, the sintered article comprises 0.05 to 0.3 mass % Si in terms of $SiO_2$ and 0.01 to 0.16 mass % Sr in terms of SrO in order to for these elements to promote the precipitation of the low dielectric loss crystal comprising the elements Si, Al, Sr, and O. On the other hand, in the case of less than 0.05 Si in terms of $SiO_2$, the sintering property is decreased, and the low dielectric loss crystal is thus less likely to be formed, whereas the low dielectric loss crystal is less likely to be sintered in the case of more than 0.3 mass % Si. In particular, from the point of view of dielectric loss and sintering property, the crystal comprises 0.1 to 0.2 mass % Si in terms of $SiO_2$.

The low dielectric loss crystal is less likely to be formed in the case of less than 0.01 Sr in terms of SrO, while the low dielectric loss crystal is less likely to be sintered in the case of more than 0.16 mass % Sr. In particular, from the point of view of dielectric loss and sintering property, the crystal comprises 0.03 to 0.13 mass % Sr in terms of SrO.

The alumina sintered article may comprise Mg as an accessory component. Mg can improve the electrical properties such as the dielectric loss, and can improve the sintering property and thus can improve the mechanical properties of the alumina sintered article.

The alumina sintered article comprises Ca as an accessory component. The addition of Ca in the same way as the element Mg improves the sintering property. However, Ca can be added in appropriate amounts from the point of view of electrical and mechanical properties. Ca may form a low loss $SrAl_2Si_2O_8$ type crystal comprising Ca among alumina crystal grains. This low dielectric loss crystal may comprise a compound represented by $(Sr, Ca)Al_2Si_2O_8$ from the point of view of electrical properties. The low dielectric loss crystal may be a compound shifted from the stoichiometric composition besides $(Sr, Ca)Al_2Si_2O_8$.

In an embodiment, the alumina sintered article may comprise 0.01 to 0.1 mass % of Mg in terms of MgO. The alumina sintered article may comprise 0.01 to 0.16 mass % of Ca in terms of CaO. The addition of Mg and/or Ca allows the alumina crystal grains to be kept from nonuniform abnormal grain growth and decrease in strength. Furthermore, the alkaline-earth metal oxides function as a sintering aid, which can improve the sintering property, and can reduce voids and defects. Thus, an alumina sintered article which has a lower dielectric loss in the megahertz to gigahertz band can be obtained even in a large size. Since the sintering property is improved, for example, a central section in the thickness direction of a thick, large-size alumina sintered article is sufficiently sintered, thereby allowing the properties of the entire thick article, such as the mechanical strength, to be improved.

From the point of view of dielectric loss and sintering property, the alumina sintered article may comprise 0.02 to 0.08 mass % of Mg in terms of MgO. In the same manner, from the point of view of dielectric loss and sintering property, the alumina sintered article may comprise 0.02 to 0.1 mass % of Ca in terms of CaO.

In an embodiment of the disclosure, the alumina sintered article may comprise at least one of $MgAl_2O_4$ and $CaAl_{12}O_{19}$ crystals. These crystals are located at the triple pockets 2 composed of the alumina crystal grains 1a, 1b and 1c. These crystals can reduce the amorphous body and thus lower the dielectric loss in the range of 1 MHz to 8.5 GHz. In particular, $MgAl_2O_4$ and $CaAl_{12}O_{19}$ have low dielectric loss in the gigahertz band, and thus lower the dielectric loss of the alumina sintered article in the gigahertz.

For the alumina sintered article according to an embodiment of the present disclosure, the dielectric loss at a measurement frequency of 1 MHz may be $5 \times 10^{-4}$ or less, and the dielectric loss at a measurement frequency of 8.5 GHz may be $5 \times 10^{-4}$ or less. Thus, the dielectric loss can be also expected to be $5 \times 10^{-4}$ or less in the frequency range of the measurement frequencies between 1 MHz and 8.5 GHz. From the point of view that a lower dielectric loss of $2 \times 10^{-4}$ or less may be expected in the frequency range mentioned above, the dielectric loss at the frequency of 1 MHz may be $2 \times 10^{-4}$ or less, and the dielectric loss at 8.5 GHz may be $2 \times 10^{-4}$ or less.

More specifically, the measurement of the dielectric loss of the alumina sintered article at the frequency of 1 MHz can confirm a dielectric loss of $5 \times 10^{-4}$ or less, thereby confirming that there is almost no increase in dielectric loss due to space charge polarization, interfacial polarization, or dipole polarization. Moreover, the peak associated with an increase in dielectric loss due to these causes is located in a frequency band lower than 1 MHz or several megahertz frequencies in the vicinity thereof. Thus, the dielectric loss of $5 \times 10^{-4}$ or less at 1 MHz can be confirmed to expect that there is almost no increase in dielectric loss due to these causes up to the vicinity of 1 GHz.

In addition, the dielectric loss of $5 \times 10^{-4}$ or less at 8.5 GHz can be confirmed to confirm that there is no increase in dielectric loss due to ionic polarization. Moreover, the peak associated with an increase in dielectric loss due to ionic polarization is located in a frequency band higher than 8.5 GHz or several gigahertz frequencies in the vicinity thereof. Thus, if the dielectric loss confirmed is $5 \times 10^{-4}$ or less at 8.5 GHz, it is expected that there is no increase in dielectric loss due to the cause of ionic polarization up to the vicinity of 1 GHz.

Therefore, if the dielectric loss confirmed is $5 \times 10^{-4}$ or less at 1 MHz and $5 \times 10^{-4}$ or less at 8.5 GHz, it can be expected in the same way that the dielectric loss is also $5 \times 10^{-4}$ or less between 1 MHz and 8.5 GHz, in particular, in a frequency range between 10 MHz and 1 GHz.

The alumina sintered article according to an embodiment of the present disclosure is used as parts for industrial machinery, and can be used, in particular, as large and thick members for use in semiconductor manufacturing apparatuses and liquid-crystal-panel manufacturing apparatuses. The member for a semiconductor manufacturing apparatus according to the present disclosure refers to an inner wall material (chamber), a microwave introduction window, a shower head, a focusing ring, a shield ring, or the like. The member for a liquid-crystal-panel manufacturing apparatus refers to a stage, a mirror, a mask holder, a mask stage, a chuck, a reticle, or the like.

In particular, in order to apply the alumina sintered article as members for semiconductor and liquid-crystal-panel manufacturing apparatuses, the alumina sintered article may have a good corrosion resistance against plasma comprising a halogen based gas. For example and without limitation, the alumina sintered article may comprise 99.5 mass % or more Al in terms of $Al_2O_3$ to have such a corrosion resistance. It is to be noted that the halogen based gas may be a fluorine based gas such as $SF_6$, $CF_4$, $CHF_3$, $ClF_3$, $NF_3$, $C_4F_8$, or HF, a chlorine based gas such as $Cl_2$, HCl, $BCl_3$, or $CCl_4$, or a bromine based gas such as $Br_2$, HBr, or $BBr_3$. In addition, in order to enhance an etching effect of a semiconductor or a liquid crystal panel, an inert gas such as Ar may be introduced along with the halogen based gas to generate plasma.

From the point of view of the sintering property, the alumina sintered article may comprise 99.9 mass % or less Al in terms of $Al_2O_3$.

Furthermore, the alumina sintered article according to the present disclosure can be also used as dielectric resonators, dielectric substrates for MIC, waveguides, and the like in high frequency regions such as microwaves and millimeter waves. In particular, the alumina sintered article may also be used as members for dielectric resonators such as supports of dielectric resonators.

A process for producing an alumina sintered article according to the present disclosure is described. In order to obtain an alumina sintered article which has a low dielectric loss, a low dielectric loss crystal in the megahertz to gigahertz bands is formed at triple pockets among alumina crystal grains. The higher density achieved by the improvement of the sintering property can provide an alumina sintered article which has a much lower dielectric loss.

In the process for producing the alumina sintered article described above, a raw powder is mixed with alumina powder, and this mixed powder is formed into a shape, and fired at 1500 to 1800° C. in the air. The raw powder comprise, without limitation, a first raw powder obtained by subjecting a mixture of a Si source and a Sr source to a heat treatment in the air is mixed with alumina powder, a second raw powder obtained by subjecting a mixture of a Si source, a Sr source and an Al source to a heat treatment in the air, and a third raw powder obtained by mixing a Si source and a Sr source.

The Sr source and Si source as referred to herein may be any of metals and salts such as oxides, hydroxides, carbonates and nitrates. The use of the raw powder of Si and Sr allows the distribution of Si and Sr in the alumina sintered article to be brought into a uniform distribution and allows an inhomogeneous sintered structure to be eliminated.

In addition, the Sr source and Si source also allow the reaction of Si and Sr to lead the formation of a low dielectric loss crystal comprising Si, Sr, Al, and O at a triple pocket. If the distribution of Si and Sr is not uniform, an amorphous body such as a glass or a crystal with a high dielectric loss will be formed, thereby causing the dielectric loss of the entire alumina sintered article to be increased.

The first raw powder can be obtained by mixing a Sr source and a Si source at a predetermined ratio so as to form, for example and without limitation, a $SrAl_2Si_2O_8$ type crystal, and subjecting the mixture to a heat treatment (also referred to as calcination) at 500 to 1400° C. in the air.

The second raw powder can be obtained by mixing Si source, a Sr source, and an Al source at a predetermined ratio so as to form, for example and without limitation, a $SrAl_2Si_2O_8$ type crystal, calcinating the resultant mixture at 500° C. to 1400° C. in the air to form the $SrAl_2Si_2O_8$ type crystal. The second raw powder comprises the $SrAl_2Si_2O_8$ type crystal. Using the second raw powder can result in the $SrAl_2Si_2O_8$ type crystal more uniformly dispersed in the alumina sintered article.

The addition of the first or second raw powder obtained by mixing at least a Si source and a Sr source and calcinating the mixture in the air to alumina powder allows the $SrAl_2Si_2O_8$ type crystal to be located at 60% or more of triple pockets. It is to be noted that the existence ratio of the $SrAl_2Si_2O_8$ type crystal can be controlled by changing the heat treatment temperature.

The third raw powder may be obtained by mixing a Si source and a Sr source at a predetermined ratio so as form, for example, a $SrAl_2Si_2O_8$ type crystal. The third raw powder can be added to the alumina powder directly without calcination. In this case, the $SrAl_2Si_2O_8$ type crystal can also be formed, and, the $SrAl_2Si_2O_8$ type crystal can be located at 10 to 30% of triple pockets. In addition, in this case, skipping a heat treatment (or cancination) can simplify the process, thereby leading to reduction in cost. However, more amorphous bodies may be formed in this case than in the cases using the first powder and the second powder.

Note that the third raw powder can be well mixed with alumina to obtain uniform distribution of Si and Sr in order to avoid to form an amorphous body in large amounts or to form a crystal having a high dielectric loss, thereby avoiding the dielectric loss of the entire alumina sintered article to be increased.

The raw powder also comprises a fourth raw powder and a fifth raw powder. The fourth raw powder is obtained by mixing a Sr source, a Si source, and a Ca source, and calcinating the resultant mixture. The fifth raw powder is obtained by mixing a Sr source, a Si source, an Al source, and a Ca source, and calcinating the resultant mixture. The Ca source may be any of metals and salts such as oxides, hydroxides, carbonates and nitrates.

The raw powder is not limited to the first to fifth raw powders. For example and without limitation, the raw powder may also comprise a powder obtained by mixing a Sr source, a Si source, and a Ca source only added and mixed, or a Sr source, a Si source, an Al source, and a Ca source only added and mixed without calcination can be used.

The raw powder may comprise powders obtained by mixing a Sr source, a Si source and a Mg source and calcinating the resultant mixture in the air, by mixing a Sr source, a Si source, a Ca source and a Mg source and subjecting the resultant mixture to calcination in the air, by mixing a Sr source, a Si source, a Ca source and a Mg source without calcination, and by mixing a Sr source, a Si source, a Al source a Ca source and a Mg source without calcination. Then such a raw powder may be mixed with alumina powder and calcined in the air. As the Mg source, metals and salts such as metal oxides, metal hydroxides, and metal carbonates can be used as powder, a solution, or the like.

For the formation of powder compacts, forming methods such as press forming, casting, cold isostatic press (CIP) forming can be used. Next, the obtained compact is calcined in the temperature range of 1500 to 1800° C. in the air. Then, an alumina sintered article having a high density and comprising the low dielectric loss crystals comprising Si, Sr, Al, and O can be formed at triple pockets among alumina crystal grains.

A method for measuring the dielectric loss of the alumina sintered article is now described.

The dielectric loss is measured at measurement frequencies of 1 MHz and 8.5 GHz for sintered articles, and the sintered articles with a dielectric dissipation factor of $5\times10^{-4}$ or less at 1 MHz and $5\times10^{-4}$ or less at 8.5 GHz are used as good quality products, thereby allowing the dielectric loss to be expected to be $5\times10^{-4}$ or less also in the measurement frequency range of 1 MHz to 8.5 GHz. This method allows a capacitance meter (HP-4278A from Hewlett-Packard Company) and a network analyzer (8722ES from Agilent Technologies) to be used, which are highly precise with respect to the dielectric loss, leading to the design of materials which has a low dielectric loss in 1 MHz to 8.5 GHz bands, which are not able to be guaranteed by conventional impedance analyzers.

When a sample which has a size for measuring the dielectric loss with the capacitance meter on the basis of JIS C2141 is used for the measurement with the network analyzer, the measurement frequency may be slightly shifted from 8.5 GHz. This shift is derived from the outer dimensional precision of the sample or the fluctuation in dielectric constant of the material, and in the case of an alumina sintered article comprising 99.3% or more $Al_2O_3$, the shift of 8.5±0.3 GHz will be expected.

More specifically, while it is conventionally known that the dielectric loss at a measurement frequency of 1 MHz and the dielectric loss at a measurement frequency of 8.5 GHz are measured respectively with the use of a capacitance meter (HP-4278A) and a cavity resonator method (a network analyzer 8722ES) to obtain accurate dielectric loss with measurement errors of $\pm2\times10^{-4}$ or less and $\pm0.1\times10^{-4}$ or less, the dielectric loss can only be measured with an impedance analyzer (HP-4291A from Hewlett-Packard Company) in the frequency range of 1 MHz to 8.5 GHz, in particular, 10 MHz to 1 GHz required for members for semiconductor and liquid-crystal-panel manufacturing apparatuses, the measurement error is on the order of $\pm30\times10^{-4}$ at minimum, and the measurement accuracy is quite low for the dielectric loss of $5\times10^{-4}$ or less.

Thus, the dielectric loss in the frequency range of 1 MHz to 8.5 GHz is not directly measured with an impedance analyzer which is low in measurement accuracy. The dielectric loss is measured at measurement frequencies of 1 MHz and 8.5 GHz, and when the dielectric loss is at the measurement frequencies of 1 MHz and 8.5 GHz fall within the range of $5 \times 10^{-4}$ or less, the dielectric loss can also be considered to be $5 \times 10^{-4}$ or less at the measurement frequencies of 1 MHz to 8.5 GHz, in particular, in the frequency range between 10 to 100 MHz. Therefore, the dielectric loss at the measurement frequencies of 1 MHz to 8.5 GHz can be measured easily and precisely.

EXAMPLE 1

First, $SiO_2$, $SrCO_3$, and $CaCO_3$ powders were weighed so as to have a raw material composition shown in FIG. 2 (i.e., weighed so as to form a $SrAl_2Si_2O_8$ type crystal) respectively in terms of $SiO_2$, in terms of SrO, and in terms of CaO, and mixed to obtain a mixed powder. The resultant mixed powder was subjected to a heat treatment at 1000° C. to 1300° C. in the air, and ground for 48 to 72 hours in an alumina ball mill, thereby forming a raw powder.

To $Al_2O_3$ powder with a purity of 99.95%, the above raw powder and $Mg(OH)_2$ powder were added at ratios as shown in FIG. 2, and a predetermined amount of water was added thereto, followed by mixing for 48 hours in an alumina ball mill, thereby obtaining a slurry. To this slurry, a binder was added, the slurry with the binder was dried and then granulated, and this mixed powder was subjected to metal forming at a pressure of 1 t/cm² to manufacture a columnar compact, and fired at 1600° C. in the air, thereby obtaining an alumina sintered article of 50 mm in diameter by 25 mm in height.

A quantitative analysis for the elements in the alumina sintered article was carried out by an inductively-coupled plasma (ICP) emission spectrometric analysis, and FIG. 2 shows the results of the elements Al, Si, Sr, Mg, and Ca respectively in terms of $Al_2O_3$, in terms of $SiO_2$, in terms of SrO, in terms of MgO, and in terms of CaO. It is to be noted that the elements other than Al, Si, Sr, Mg, and Ca is referred to as a remainder, and the amount of the remainder is also shown therein. The remainder mainly comprised $Na_2O$ and $Fe_2O_3$.

Figure 4:
FIG. 4 is an exemplary electron diffraction image of sample No. 1-10.

It was confirmed by X-ray diffraction measurements that all samples in FIG. 2 had alumina crystal grains as main crystal grains. Furthermore, the presence or absence of a crystal represented by $MgAl_2O_4$ or $CaAl_{12}O_{19}$ was confirmed by the X-ray diffraction measurements, and is shown in FIG. 4 as the presence of spinel, or the like.

Samples of 1 mm thick were cut from central sections in the height direction of the obtained alumina sintered articles, and the density and dielectric loss of the samples were measured, which are shown in FIG. 3. The density was measured by an Archimedes method.

In addition, the dielectric loss tan δ was measured at 1 MHz, 12 MHz, and 8.5 GHz respectively with the use of a capacitance meter (HP-4278A), an impedance analyzer (HP-4291A), and a cavity resonance method (network analyzer 8722ES).

Further, the frequency dependence of the dielectric loss in 1 MHz to 1 GHz was also confirmed by the impedance analyzer. The result was that for the dielectric loss in 1 MHz to 1 GHz in consideration of the accuracy of the apparatus, these samples had a tendency to exhibit a higher dielectric loss at 1 to 10 MHz and 100 MHz to 1 GHz and exhibit a lower dielectric loss in the frequency band therebetween, in particular, exhibit a lower dielectric loss at 10 to 100 MHz. The dielectric loss had no peak in the frequency band of 10 to 100 MHz, and had a flat shape.

First, the network analyzer was used with a sample of 50 mm in diameter by 1 mm in thickness held by a fixture to obtain the dielectric loss at 8.5 GHz. Next, the impedance analyzer was used with the sample of 50 mm in diameter by 1 mm in thickness held by a fixture to obtain the dielectric loss at 12 MHz. Thereafter, on the basis of JIS C2141, electrodes were formed on the upper and lower surfaces of the sample of 50 mm in diameter by 1 mm in thickness, and the dielectric loss at 1 MHz was obtained by use of the capacitance meter.

In addition, the analysis of the crystal in each sintered article was carried out by an energy dispersive X-ray spectrometric analysis (EDS) and selected area electron diffraction with the use of a transmission electron microscope (TEM), thereby confirming 30 triple pockets of grain boundaries regarding the presence or absence of a $MAl_2Si_2O_8$ type crystal (M is at least one of Sr and Ca). The contents of the crystal and the amorphous body at a triple pocket are shown in FIG. 3. In addition, FIG. 2 shows the presence or absence of the $SrAl_2Si_2O_8$ type crystal.

It was confirmed by the selected area electron diffraction whether the phase at the triple pockets is amorphous or not. The amorphous body comprised the elements Si, Al, Sr, and O. In addition, the crystal at the triple pockets was identified as the $MAl_2Si_2O_8$ type crystal, where M is Sr or Ca, or Sr and Ca, as shown in FIG. 3. FIG. 4 shows an exemplary electron diffraction image of sample No. 1-10.

Furthermore, for an average grain diameter $D_{50}$ of alumina crystal grains, the diameter of each crystal grain was obtained by use of an image analyzer for the range of 0.0432 mm² in scanning electron micrographs (500×) of the samples, and the average grain diameter $D_{50}$ was calculated, which is shown in FIG. 3.

In addition, the bending strength of the alumina sintered article was measured in accordance with JIS R1601, which is shown in FIG. 3.

Referring to FIGS. 2 and 3, the samples comprising Si and Sr as well as $Al_2O_3$ comprise a $SrAl_2Si_2O_8$ type crystal at a triple pocket located among alumina crystal grains. Such alumina sintered articles have a dielectric loss of $2.2 \times 10^{-4}$ or less at 8.5 GHz and a dielectric loss of $29 \times 10^{-4}$ or less at 1 MHz, and also have a low loss of $5.1 \times 10^{-4}$ or less at 12 MHz.

In addition, the dielectric loss is lower when the $SrAl_2Si_2O_8$ type crystal is located at 60% or more of triple pockets. Furthermore, the bending strength is 350 MPa or more because the average grain diameter of the alumina crystal grains is 9.8 μm or less.

Sample No. 1-13 was prepared as follows. To $Al_2O_3$ powder with a purity of 99.95 mass %, $SiO_2$ powder, $CaCO_3$ powder, and $Mg(OH)_2$ powder were each added at ratios as shown in sample No. 1-13 of FIG. 2, and a predetermined amount of water was added thereto, followed by mixing for 48 hours in a ball mill to obtain slurry. To this slurry, a binder was added, the slurry with the binder was dried and then granulated, and this mixed powder was formed at a pressure of 1 t/cm² to from a powder compact, and the compact was fired at 1600° C. to obtain an alumina sintered article of 50 mm in diameter by 25 mm in height.

A central section (1 mm thick) in the height direction of the obtained sintered article was cut, and evaluated in the same way as in the example described above. A crystal comprising Si, Ca, Al, and O was formed in a very small amount among alumina crystal grains. While the dielectric loss had a value of $1.4 \times 10^{-4}$ or less at 8.5 GHz, which indicates a low loss, the dielectric loss was high in the megahertz band, $40 \times 10^{-4}$ at 1 MHz and $7 \times 10^{-4}$ at 12 MHz.

EXAMPLE 2

First, $SiO_2$, $SrCO_3$, $CaCO_3$, and $BaCO_3$ powders were weighed so as to form a $SrAl_2Si_2O_8$ type crystal, and mixed to obtain a mixed powder. This mixed powder was subjected to a heat treatment at 1000° C. to 1300° C., and ground for 48 to 72 hours in an alumina ball mill, thereby forming a raw powder.

To $Al_2O_3$ powder with a purity of 99.95%, the above raw powder and $Mg(OH)_2$ powder were added, and a predetermined amount of water was added thereto, followed by mixing for 48 hours in an alumina ball mill, thereby obtaining a slurry. To this slurry, a binder was added, the slurry with the binder was dried and then granulated, and this mixed powder was subjected to metal forming at a pressure of 1 t/cm² to manufacture a columnar compact, and fired at a temperature of 1680° C. in the air, thereby obtaining an alumina sintered article of 50 mm in diameter by 25 mm in height.

The quantitative analysis for the elements in the alumina sintered article was carried out by an ICP emission spectrometric analysis, and FIG. 5 shows the results of the elements Al, Si, Sr, Mg, Ca, and Ba respectively in terms of $Al_2O_3$, in terms of $SiO_2$, in terms of SrO, in terms of MgO, in terms of CaO, and in terms of BaO. It is to be noted that the elements other than Al, Si, Sr, Mg, Ca, and Ba is referred to as a remainder, and the amount of the remainder is also shown therein. The remainder mainly comprised $Na_2O$ and $Fe_2O_3$. It was confirmed by X-ray diffraction measurements that all of the samples in FIG. 5 had alumina crystal grains as main crystal grains. Furthermore, the presence or absence of a crystal represented by $MgAl_2O_4$ or $CaAl_{12}O_{19}$ was confirmed by the X-ray diffraction measurements, and is shown in FIG. 6 as the presence of spinel, or the like.

Samples of 1 mm thick were cut from central sections in the height direction of the obtained alumina sintered articles, and the density and dielectric loss of the samples were measured, which are shown in FIG. 6. The density was measured by an Archimedes method.

In addition, the dielectric loss tan δ was measured at 1 MHz, 12 MHz, and 8.5 GHz respectively with the use of a capacitance meter (HP-4278A), an impedance analyzer (HP-4291A), and a cavity resonance method (network analyzer 8722ES). While the measurement error of the capacitance meter and the measurement error of the cavity resonance method are respectively $\pm 2 \times 10^{-4}$ or less and $\pm 0.1 \times 10^{-4}$ or less, the measurement error of the impedance analyzer is $\pm 30 \times 10^{-4}$. Thus, when the dielectric loss measured with the impedance analyzer at 12 MHz is less than $5 \times 10^{-4}$, the result "<5" is shown in FIG. 6.

Further, the frequency dependence of the dielectric loss in 1 MHz to 1 GHz was also confirmed by the impedance analyzer. The result was that for the dielectric loss in 1 MHz to 1 GHz in consideration of the accuracy of the apparatus, these samples had a tendency to exhibit a higher dielectric loss at 1 to 10 MHz and 100 MHz to 1 GHz and exhibit a lower dielectric loss in the frequency band therebetween, in particular, exhibit a lower dielectric loss at 10 to 100 MHz. The dielectric loss had no peak in the frequency band of 10 to 100 MHz, and had a flat shape.

First, the network analyzer was used with a sample of 50 mm in diameter by 1 mm in thickness held by a fixture to obtain the dielectric loss at 8.5 GHz. Next, the impedance analyzer was used with the sample of 50 mm in diameter by 1 mm in thickness held by a fixture to obtain the dielectric loss at 12 MHz. Thereafter, on the basis of JIS C2141, electrodes were formed on the upper and lower surfaces of the sample of 50 mm in diameter by 1 mm in thickness, and the dielectric loss at 1 MHz was obtained by use of the capacitance meter.

Figure 7:
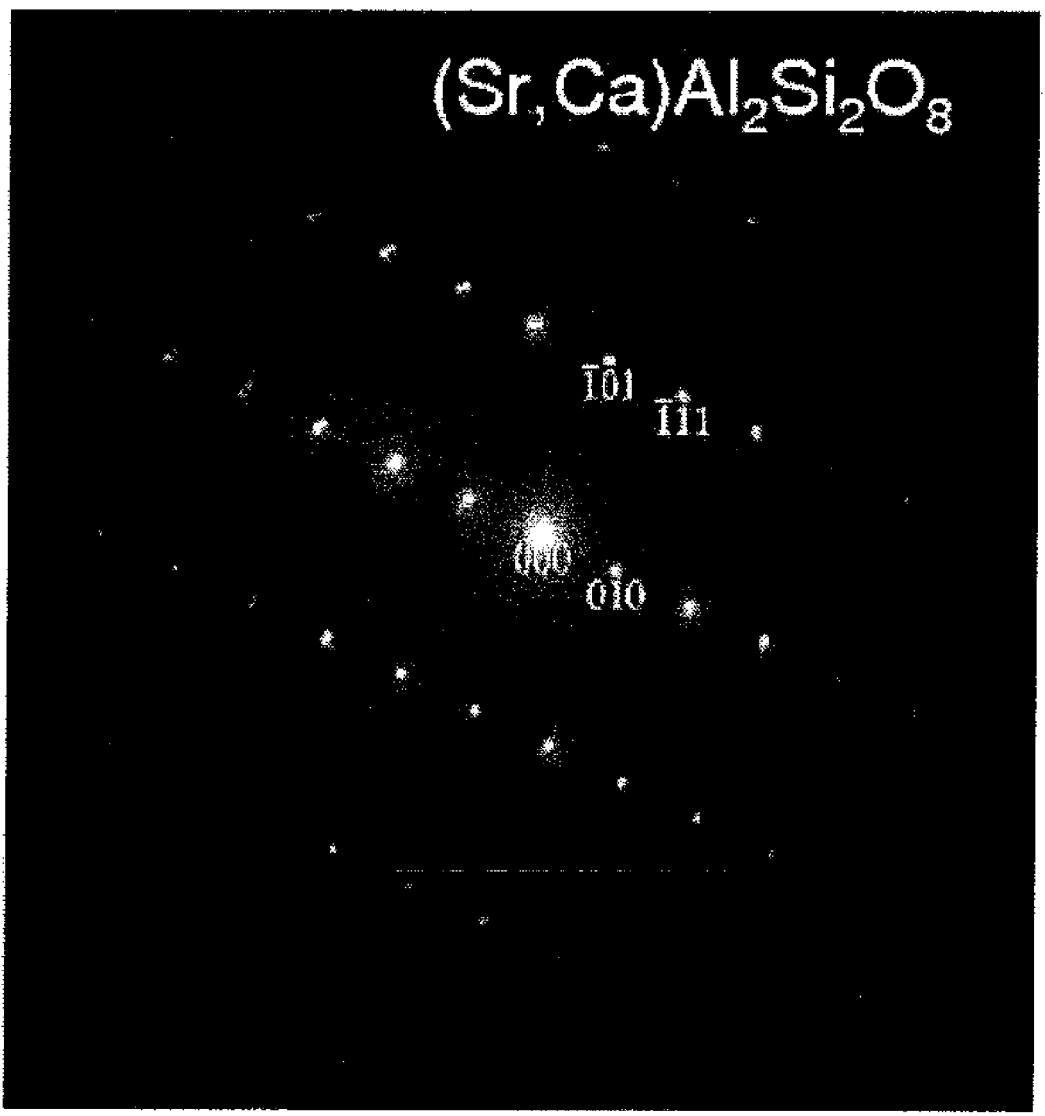
FIG. 7 is an exemplary electron diffraction image of sample No. 2-9.

In addition, the analysis of the crystal in each sintered article was carried out by an energy dispersive X-ray spectrometric analysis (EDS) and selected area electron diffraction with the use of a transmission electron microscope (TEM), thereby confirming 30 triple pockets of grain boundaries regarding the presence or absence of a $MAl_2Si_2O_8$ type crystal (M is at least one of Sr, Ca, and Ba). The contents of the crystal and the amorphous body at a triple pocket are shown in FIG. 6. It was confirmed by the selected area electron diffraction whether the phase at the triple pockets is amorphous or not. The amorphous body comprised the elements Si, Al, Sr, and O. The crystal comprising Si, Al, Sr, and O at the triple pockets was identified as the $SrAl_2Si_2O_8$ type crystal, where M is Sr and Ca, or Sr, Ca, and Ba, or Ca, as shown in FIG. 6. FIG. 7 shows an exemplary electron diffraction image of sample No. 2-9.

Furthermore, for the average grain diameter $D_{50}$ of alumina crystal grains, the diameter of each crystal grain was obtained by use of an image analyzer for the range of 0.0432 mm² in scanning electron micrographs (500×) of the samples, and the average grain diameter $D_{50}$ was calculated, which is shown in FIG. 6.

In addition, the bending strength of the alumina sintered article was measured in accordance with JIS R1601, which is shown in FIG. 6.

Referring to FIGS. 5 and 6, the samples according to the present disclosure have a dielectric loss of $2.2 \times 10^{-4}$ or less at 8.5 GHz and $4 \times 10^{-4}$ or less at 1 MHz, the samples also have a low loss of less than $5 \times 10^{-4}$ at 12 MHz.

Sample No. 2-1 prepared by subjecting the $SiO_2$, $SrCO_3$, and $CaCO_3$ powders to a heat treatment and adding the powder to the $Al_2O_3$ powder, which had a small amount of $SiO_2$, 0.02 mass % $SiO_2$, indicated a high dielectric loss of $29 \times 10^{-4}$ at 1 MHz and $6.2 \times 10^{-4}$ at 8.5 GHz.

Sample No. 2-14 was prepared as follows. To $Al_2O_3$ powder with a purity of 99.95 mass %, $SiO_2$ powder, $CaCO_3$ powder, and $Mg(OH)_2$ powder were each added separately, and a predetermined amount of water was added thereto, followed by mixing for 48 hours in a ball mill to obtain a slurry. To this slurry, a binder was added, the slurry with the binder was dried and then granulated, and this mixed powder was formed at a pressure of 1 t/cm² to form a powder compact, and the compact was fired at 1670° C. to obtain an alumina sintered article of 50 mm in diameter by 25 mm in height.

A central section (1 mm thick) in the height direction of the obtained sintered article was cut, and the density and dielectric properties were measured in the same way as in the example described above. A crystal comprising Si, Ca, Al, and O was formed in a very small amount among alumina crystal grains, whereas the remainder was $MgAl_2O_4$ which was mostly an amorphous body comprising the elements Si, Al, Ca, and O. While the dielectric loss had a value of $1.6 \times 10^{-4}$ or less at 8.5 GHz, which indicates a low loss, the dielectric loss was high in the megahertz band, $45 \times 10^{-4}$ at 1 MHz and $8 \times 10^{-4}$ at 12 MHz.

EXAMPLE 3

First, $SiO_2$, $SrCO_3$, $CaCO_3$, and $BaCO_3$ powders were weighed so as to form a $MAl_2Si_2O_8$ type crystal, and mixed in a dry manner to obtain a mixed powder, where M is Sr or Ca, or Sr and Ca, or Sr and Ba.

To $Al_2O_3$ powder with a purity of 99.95%, the above raw powder and $Mg(OH)_2$ powder were added, and a predetermined amount of water was added thereto, followed by mixing for 48 hours in an alumina ball mill, thereby obtaining a slurry. To this slurry, a binder was added, the slurry with the binder was dried and then granulated, and this mixed powder was subjected to metal forming at a pressure of 1 t/cm² to manufacture a columnar compact, and fired at a temperature of 1670° C. in the air, thereby obtaining an alumina sintered article of 50 mm in diameter by 25 mm in height.

Sample No. 3-1 was prepared by adding $SiO_2$ powder, $SrCO_3$ powder, $CaCO_3$ powder, and $Mg(OH)_2$ powder separately to $Al_2O_3$ powder with a purity of 99.95% so as to form a $SrAl_2Si_2O_8$ type crystal and a predetermined amount of water was added thereto, followed by mixing for 48 hours in a ball mill to obtain a slurry. To this slurry, a binder was added, the slurry with the binder was dried and then granulated, and this mixed powder was formed at a pressure of 1 t/cm² to form a powder compact, and the compact was fired at a temperature of 1670° C. in the air to obtain an alumina sintered article of 50 mm in diameter by 25 mm in height.

In addition, sample No. 3-14 was prepared by added $SiO_2$ powder, $CaCO_3$ powder, and $Mg(OH)_2$ powder separately to $Al_2O_3$ powder with a purity of 99.95% so as to form a $SrAl_2Si_2O_8$ type crystal, and a predetermined amount of water was added thereto, followed by mixing for 48 hours in a ball mill to obtain a slurry. To this slurry, a binder was added, the slurry with the binder was dried and then granulated, and this mixed powder was formed at a pressure of 1 t/cm² to form a powder compact, and the compact was fired at a temperature of 1670° C. in the air to obtain an alumina sintered article of 50 mm in diameter by 25 mm in height.

The quantitative analysis for the elements in the alumina sintered article was carried out by an ICP emission spectrometric analysis, and FIG. 8 shows the results of the elements Al, Si, Sr, Mg, Ca, and Ba respectively in terms of $Al_2O_3$, in terms of $SiO_2$, in terms of $SrO$, in terms of $MgO$, in terms of $CaO$, and in terms of $BaO$. It is to be noted that the elements other than Al, Si, Sr, Mg, Ca, and Ba is referred to as a remainder, and the amount of the remainder is also shown therein. The remainder mainly comprised $Na_2O$ and $Fe_2O_3$. It was confirmed by X-ray diffraction measurements that all of the samples in FIG. 8 had alumina crystal grains as main crystal grains. Furthermore, the presence or absence of a crystal represented by $MgAl_2O_4$ or $CaAl_{12}O_{19}$ was confirmed by the X-ray diffraction measurements, and is shown in FIG. 9 as the presence of spinel, or the like.

Samples of 1 mm thick were cut from central sections in the height direction of the obtained alumina sintered articles, and the density and dielectric loss of the samples were measured, which are shown in FIG. 9. The density was measured by an Archimedes method.

In addition, a dielectric loss tan δ was measured at 1 MHz, 12 MHz, and 8.5 GHz respectively with the use of a capacitance meter (HP-4278A), an impedance analyzer (HP-4291A), and a cavity resonance method (network analyzer 8722ES). While the measurement error of the capacitance meter and the measurement error of the cavity resonance method are respectively $\pm 2 \times 10^{-4}$ or less and $\pm 0.1 \times 10^{-4}$ or less, the measurement error of the impedance analyzer is $\pm 30 \times 10^{-4}$. Thus, when the dielectric loss measured with the impedance analyzer at 12 MHz is less than $5 \times 10^{-4}$, the result "<5" is shown in FIG. 9.

Further, the frequency dependence of the dielectric loss in 1 MHz to 1 GHz was also confirmed by the impedance analyzer. The result was that for the dielectric loss in 1 MHz to 1 GHz in consideration of the accuracy of the apparatus, these samples had a tendency to exhibit a higher dielectric loss at 1 to 10 MHz and 100 MHz to 1 GHz and exhibit a lower dielectric loss in the frequency band therebetween, in particular, exhibit a lower dielectric loss at 10 to 100 MHz. The dielectric loss had no peak in the frequency band of 10 to 100 MHz, and had a flat shape.

First, the network analyzer was used with a sample of 50 mm in diameter by 1 mm in thickness held by a fixture to obtain the dielectric loss at 8.5 GHz. Next, the impedance analyzer was used with the sample of 50 mm in diameter by 1 mm in thickness held by a fixture to obtain the dielectric loss at 12 MHz. Thereafter, on the basis of JIS C2141, electrodes were formed on the upper and lower surfaces of the sample of 50 mm in diameter×1 mm in thickness, and the dielectric loss at 1 MHz was obtained by use of the capacitance meter.

Figure 10:
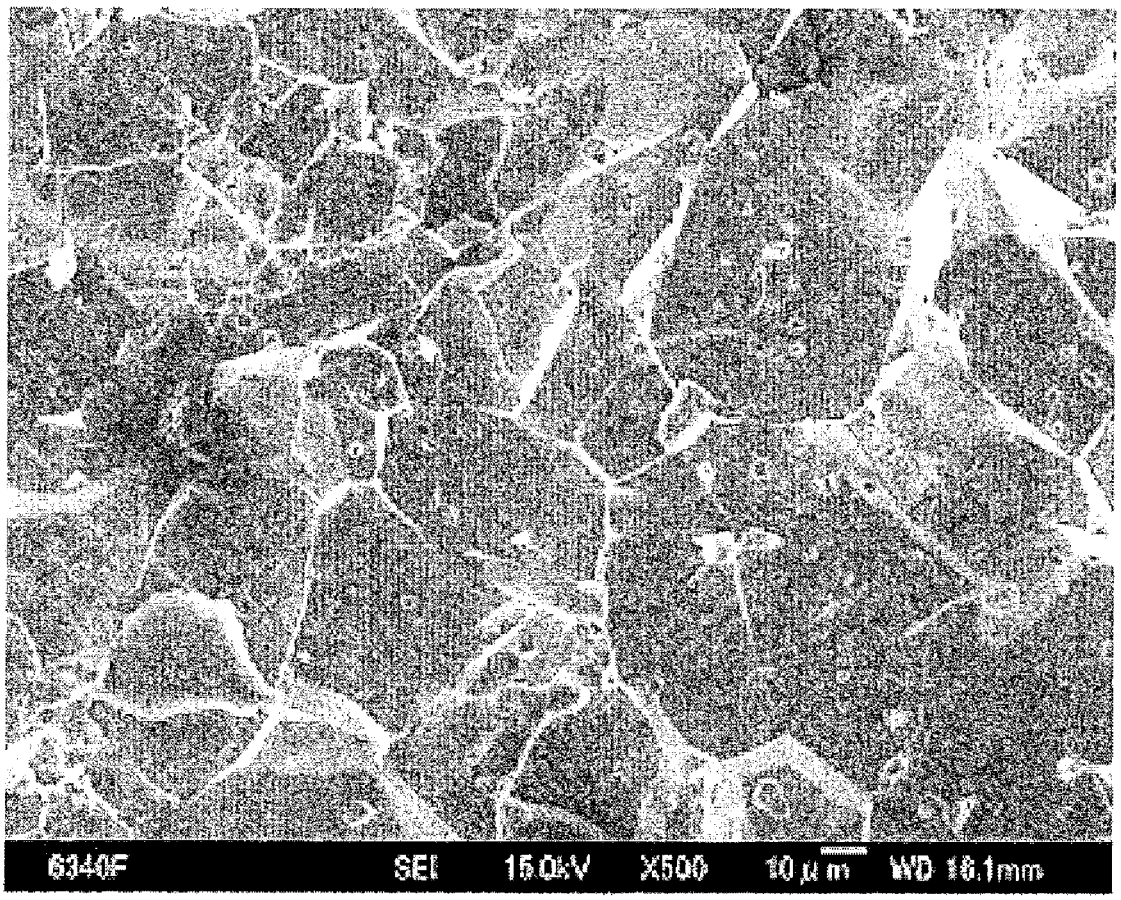
FIG. 10 is an exemplary SEM photograph of a cross section of an alumina sintered article of sample No. 3-12.
Figure 11A:
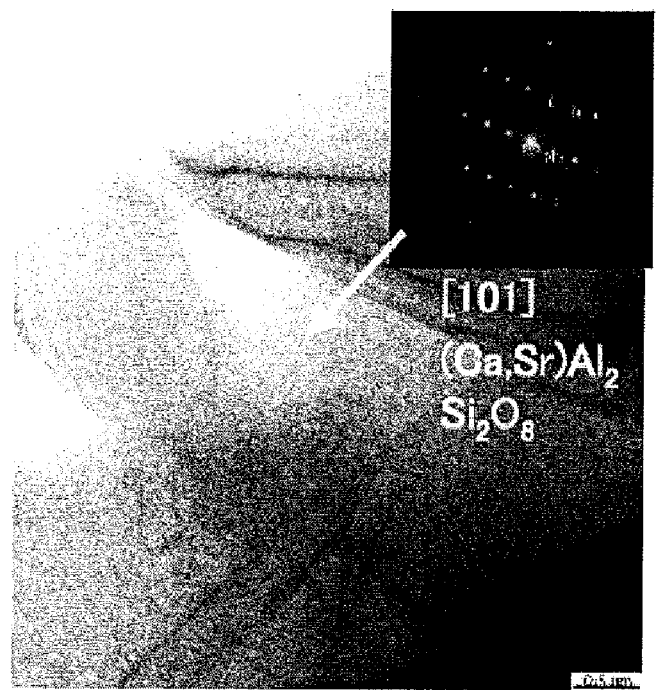
FIG. 11A is a TEM photograph and an electron diffraction image of a crystal at a triple pocket of sample No. 3-12.
Figure 11B:
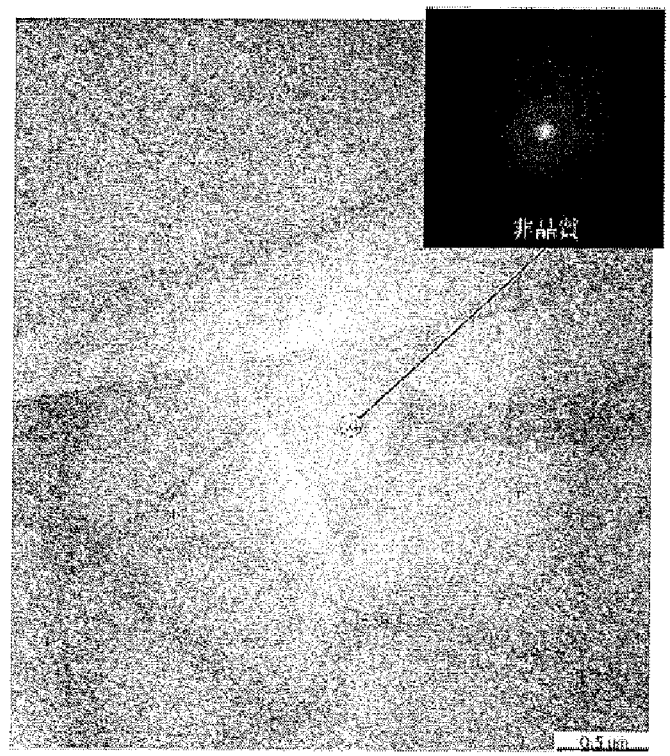
FIG. 11B is a TEM photograph and an electron diffraction image of a crystal at a triple pocket of sample No. 3-12.

In addition, the analysis of the crystal in each sintered article was carried out by an energy dispersive X-ray spectrometric analysis (EDS) and selected area electron diffraction with the use of a transmission electron microscope (TEM), thereby confirming 30 triple pockets of grain boundaries for each sample regarding the presence or absence of a $MAl_2Si_2O_8$ type crystal which is a crystal comprising the elements Si, Al, M (M=Ca, Sr, Ba), and O. The contents of the $MAl_2Si_2O_8$ type crystal and the amorphous body at a triple pocket are shown in FIG. 9. In addition, the presence or absence of a $SrAl_2Si_2O_8$ type crystal is shown in FIG. 8. It was confirmed by the selected area electron diffraction whether the phase at the triple pockets is amorphous or not. FIG. 10 is SEM photograph a sample No. 3-12. FIG. 10 shows an exemplary SEM photograph of a cross section of an alumina sintered article of No. 3-12, FIG. 11A shows a TEM photograph and an electron diffraction image of a crystal at a triple pocket of sample No. 3-12 and FIG. 11B shows a TEM photograph and an electron diffraction image of a crystal at a triple pocket of sample No. 3-12.

Furthermore, for the average grain diameter $D_{50}$ of alumina crystal grains, the diameter of each crystal grain was obtained by use of an image analyzer for the range of 0.0432 mm² in scanning electron micrographs (500×) of the samples, and the average grain diameter $D_{50}$ was calculated, which is shown in FIG. 9.

In addition, the bending strength of the alumina sintered article was measured in accordance with JIS R1601, which is shown in FIG. 9.

Referring to FIGS. 8 and 9, the samples according to the present disclosure have a dielectric loss of $2.3 \times 10^{-4}$ or less at 8.5 GHz and $2 \times 10^{-4}$ or less at 1 MHz, and the samples also have a low loss of $5 \times 10^{-4}$ or less at 12 MHz.

Sample No. 3-14 prepared by separately adding the $SiO_2$ powder, $CaCO_3$ powder, and $Mg(OH)_2$ powder to alumina powder, had a crystal composed of the elements Si, Ca, Al, and O located at triple pockets of alumina crystal grains, and indicated a low loss of $1.6 \times 10^{-4}$ or less at 8.5 GHz. However, the dielectric loss was high in the megahertz band, $45 \times 10^{-4}$ at 1 MHz and $8 \times 10^{-4}$ at 12 MHz.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An alumina sintered article comprising:
   99.3 mass % or more Al in terms of $Al_2O_3$;
   0.05 mass % or more Si in terms of $SiO_2$; and
   0.01 mass % or more Sr in terms of SrO, and the alumina sintered article further comprising:
   alumina crystal grains as main crystal grains; and
   a first crystal comprising Si, Al, Sr, and O at a triple pocket among the alumina crystal grains.

2. The alumina sintered article according to claim 1, wherein the first crystal comprises a $SrAl_2Si_2O_8$ type crystal.

3. The alumina sintered article according to claim 1, wherein a ratio of a number of triple pockets comprising the first crystal to a number of all triple pockets in the alumina sintered article is 10% or more.

4. The alumina sintered article according to claim 1, wherein a ratio of a number of triple pockets comprising the first crystal to a number of all triple pockets in the alumina sintered articles is 60% or more.

5. The alumina sintered article according to claim 1, wherein the alumina sintered article comprises at most of 0.3 mass % Si in terms of $SiO_2$.

6. The alumina sintered article according to claim 1, wherein the alumina sintered article comprises at most of 0.16 mass % Sr in terms of SrO 7. The alumina sintered article according to claim 1, further comprising: 0,01 to 0.1 mass % Mg in terms of MgO.

8. The alumina sintered article according to claim 1, further comprising 0.01 to 0.16 mass % Ca in terms of CaO.

9. The alumina sintered article according to claim 1, wherein the average grain diameter of the alumina crystal grains is at least 10 μm.

10. The alumina sintered article according to any of claim 1, further comprising a second crystal comprising at least one of $MgAl_2O_4$ crystal and $CaAl_{12}O_{19}$ crystal.

11. The alumina sintered article according to any of claim 1, wherein the dielectric loss or dielectric loss tangent at a frequency of 1 MHz is $5 \times 10^{-4}$ or less, and the dielectric loss at a frequency of 8.5 GHz is $5 \times 10^{-4}$ or less.

12. A member of a semiconductor manufacturing apparatus, comprising the alumina sintered article according to claim 1.

13. A member of a liquid-crystal-display panel manufacturing apparatus, comprising the alumina sintered article according to claim 1.

14. A member of a dielectric resonator, comprising the alumina sintered article according to claim 1.

* * * * *